(12) United States Patent
Ozaki et al.

(10) Patent No.: US 7,733,083 B2
(45) Date of Patent: Jun. 8, 2010

(54) SENSOR-INCORPORATED BEARING ASSEMBLY FOR WHEELS

(75) Inventors: Takayoshi Ozaki, Iwata (JP); Takashi Koike, Iwata (JP); Tomomi Ishikawa, Iwata (JP)

(73) Assignee: NTN Corporation, Osaka (JP)

( * ) Notice: Subject to any disclaimer, the term of this patent is extended or adjusted under 35 U.S.C. 154(b) by 481 days.

(21) Appl. No.: 11/667,243

(22) PCT Filed: Nov. 1, 2005

(86) PCT No.: PCT/JP2005/020065

§ 371 (c)(1),
(2), (4) Date: May 8, 2007

(87) PCT Pub. No.: WO2006/049145

PCT Pub. Date: May 11, 2006

(65) Prior Publication Data

US 2008/0037919 A1     Feb. 14, 2008

(30) Foreign Application Priority Data

Nov. 8, 2004   (JP) ............................. 2004-323451

(51) Int. Cl.
*G01B 7/30*   (2006.01)
(52) U.S. Cl. .................. 324/207.25; 324/173; 384/448
(58) Field of Classification Search ................ 324/173, 324/207.25; 384/448
See application file for complete search history.

(56) References Cited

U.S. PATENT DOCUMENTS

| | | | |
|---|---|---|---|
| 4,743,786 A | 5/1988 | Ichikawa et al. | |
| 6,471,407 B1 | 10/2002 | Katano | |
| 6,512,360 B1 | 1/2003 | Goto et al. | |
| 6,566,862 B1 | 5/2003 | Goto et al. | |
| 2002/0097040 A1 | 7/2002 | Takizawa et al. | |

FOREIGN PATENT DOCUMENTS

JP       2004-45219       2/2004

OTHER PUBLICATIONS

Patent Abstract of Japan, Japanese Publication No. 61-122504, Published Jun. 10, 1986.
Patent Abstract of Japan, Japanese Publication No. 2001-235307, Published Aug. 31, 2001.
Patent Abstract of Japan, Japanese Publication No. 2002-340922, Published Nov. 27, 2002.
Patent Abstract of Japan, Japanese Publication No. 2001-021577, Published Jan. 26, 2001.
International Search Report of the International Published Application No. PCT/JP2005/020065 (mailed Jan. 24, 2006).
International Preliminary Report on Patentability mailed on Nov. 1, 2005 and issued in corresponding International Patent Application No. PCT/JP2005/020065.

*Primary Examiner*—Reena Aurora

(57) ABSTRACT

A sensor-incorporated wheel support bearing assembly including double rows of rolling elements interposed between respective raceways of outer and inner members opposed to each other, a to-be-detected ring having an eccentric or multangular outer diametric shape provided in the inner member and displacement sensors provided on the outer member confronting the to-be-detected ring. In the bearing assembly, the displacement sensors have facing portion areas, variable and invariable, respectively, arranged with rotation of the to-be-detected ring.

10 Claims, 9 Drawing Sheets

SENSOR-INCORPORATED BEARING ASSEMBLY FOR WHEELS

CROSS REFERENCE TO RELATED APPLICATION

This application is based on and claims priority to International Application PCT/JP2005/020065 filed Nov. 1, 2005 and Japanese Application No. 2004-323451 filed Nov. 8, 2004, the disclosures of which are hereby incorporated herein by reference.

BACKGROUND OF THE INVENTION

1. Field of the Invention

The present invention relates to a sensor-incorporated bearing assembly for wheels, having a built-in device that serves as a load sensor for detecting a load acting on a bearing portion of a wheel and/or an angle sensor for detecting the rotation angle of the wheel.

2. Description of the Prior Art

For safety travel of an automotive vehicle, the use has hitherto been made of a sensor on wheel support bearing assemblies for detecting the respective rotational speeds of wheels. In such a wheel support bearing assembly, it has been suggested in, for example, the Japanese Laid-open Patent Publications No. 2002-340922, published Nov. 27, 2002, and No. 2001-21577, published Jan. 26, 2001, to provide the bearing assembly with at least one extra sensor such as, for example, a temperature sensor, a vibration sensor or a load sensor so that in addition to the rotational speed, a parameter indicative of a condition useful in travel of an automotive vehicle can be detected.

While the measures for assuring the running safety of the automotive vehicle hitherto generally employed is practiced by detecting the rotational speed of each of vehicle wheels, it has however been found that the detection of only the rotational speed is insufficient and, therefore, it is increasingly desired that the control on the safety side can be accomplished with the use of any extra sensor signals. To meet this desire, it may be contemplated to control the vehicle attitude based on the load imposed on each of the vehicle wheels during the run of the automotive vehicle. By way of example, during cornering of the automotive vehicle, a larger load acts on outer vehicle wheels; during running on a transversely tilted surface, a larger load acts on vehicle wheels on one side of the automotive vehicle; and during braking, a large load acts on front vehicle wheels. Thus, the load does not always act on the vehicle wheels uniformly at all times during the run of the automotive vehicles.

Also, even in the case of the uneven live load, the loads acting on those wheels tend to become uneven. In view of this, if the loads acting on the wheels can be detected as needed, suspension systems for the vehicle wheels, for example, can be controlled beforehand based on results of detection of the loads so that the attitude control of the automotive vehicle during the run thereof (for example, prevention of a rolling motion during the cornering, prevention of diving of the front wheels during the braking, and prevention of diving of the vehicle wheels brought about by an uneven distribution of live loads) can be accomplished. However, no suitable space for installation of the load sensor for detecting the load acting on the respective vehicle wheel is available and, therefore, the attitude control through the detection of the load can hardly be realized.

Moreover, in the event that in the near future a steer-by-wire system, in which the wheel axle and the steering system are not coupled mechanically with each other, is introduced, transmission of information on the road surface to the steering wheel then held by a driver would be required by detecting a load acting in a direction parallel to the wheel axle.

SUMMARY OF THE INVENTION

In view of the foregoing, the present invention has been devised to substantially eliminate the problems and inconveniences and is intended to provide a bearing assembly for a wheel, which is capable of detecting the load acting on the wheel and the rotational speed of the wheel and in which means that may serve as a load sensor and/or a rotation sensor can be installed compactly.

A sensor-incorporated wheel support bearing assembly according to one aspect of the present invention is a sensor-incorporated wheel support bearing assembly for rotatably supporting a wheel relative to a vehicle body structure, which assembly includes an outer member having an inner peripheral surface formed with a plurality of raceways defined therein, an inner member formed with raceways defined therein that are respectively opposed to the raceways in the outer member and coupled with the wheel, a plurality of rows of rolling elements interposed between the raceways that are opposed to each other, a to-be-detected ring provided on the inner member and having an eccentric or multangular outer diametric shape, and first and second displacement sensors provided on the outer member. The first displacement sensor is so arranged to have a facing portion area thereon, which faces to the to-be-detected ring, variable with rotation of the to-be-detected ring, and the second displacement sensor is so arranged to have a facing potion area thereon, which faces to the to-be-detected ring, invariable with rotation of the to-be-detected ring. By suitably selecting, for example, the position at which the displacement sensor is disposed, those displacement sensors have their facing potion area rendered to be invariable with rotation of the to-be-detected ring.

It is to be noted that the multangular shape is not always limited to a polygonal shape and it may be a shape having hills and dales periodically varying in a circumferential direction or similar to the shape of a gear and is meant to have a plurality of locations like hills and dales.

According to this construction, the load sensor and the rotational angle sensor can be installed compactly in the automotive vehicle and both of the load acting on the wheel and the rotational speed of the wheel can be stably detected.

In the present invention, a circuit may be provided for detecting a rotation angle of the inner member from an output of the first displacement sensors having the facing portion area variable with rotation of the to-be-detected ring and a circuit for detecting a load acting on the inner member from an output of the second displacement sensor having the facing portion area invariable with rotation of the to-be-detected ring.

According to this construction, of the two types of the displacement sensors, the displacement sensor having the facing portion area invariable with rotation of the to-be-detected ring is used to detect a change of an air gap when the inner member having the wheel coupled therewith is tilted under the influence of the load acting thereon, allowing the tilt of the inner member to be detected thereby. The load acting on the inner member can be detected when the tilt of the inner member is so detected. In other words, by employing a circuit for detecting the load on the inner member from an output of the displacement sensor by means of calculation or the like, it acts as a load sensor.

On the other hand, the displacement sensor having the facing portion area variable with rotation of the to-be-detected ring provides an output variable in response to change of the facing portion area when the to-be-detected ring rotates together with the inner member. Since the to-be-detected ring has an eccentric or multangular shape, the output of the displacement sensor varies continuously with rotation. For this reason, the rotation angle of the wheel can be ascertained with this output from the displacement sensor. The provision of the circuit for detecting the rotational angle from the output of the displacement sensor by means of, for example, calculation allows it to function as an angle sensor.

The displacement sensors, which function as the load sensor and the angle sensor, commonly utilize the same to-be-detected ring and, therefore, as compared with the use of separate to-be-detected rings, a compact construction can be obtained. Also, since the use made of the to-be-detected ring and the displacement sensor, a stable detection is possible.

As described above, the circuit forming the load sensor and the rotational angle sensor can be compactly installed in the automotive vehicle and the load acting on the wheel and the rotational speed of the wheel can be detected stably.

In the present invention, two of the first displacement sensor having the facing portion areas variable with rotation of the to-be-detected ring may be arranged on a circumference so that respective electric angles of outputs thereof are offset 90° in phase from each other, and a circuit may be also provided for detecting the rotation angle of the inner member from the output signals.

In the case of this construction, not only the rotation angle of the inner member, but also the direction of rotation thereof can be detected from those two sensor signals provided to have respective output electric angles offset 90° in phase relative to each other.

In the present invention, the first displacement sensor having the facing portion area variable with rotation of the to-be-detected ring and the second displacement sensor having the facing portion area invariable with rotation of the to-be-detected ring may be provided in the form of one or more sensor units arranged in a circumferential direction, with each sensor unit including the displacement sensors that are arranged symmetrically on respective sides of the to-be-detected ring.

By arranging the displacement sensors are arranged symmetrically on respective sides of the to-be-detected ring as hereinabove described, a wobbling motion of the to-be-detected ring during rotation thereof and/or a load component occurring when the load acts can be counterbalanced. For example, while the displacement sensor for the detection of the rotational angle can be accompanied by an offset of the signal depending on the magnitude of the bending moment when the latter acts on the inner member, resulting in an adverse influence on the angle detection, positioning of the two displacement sensors on the respective sides of the to-be-detected ring in opposition thereto and taking an average of respective outputs of the two displacement sensors can eliminate the adverse influence which may be brought about by the load. It is to be noted that in this case, even by connecting the respective coiled windings of those two displacement sensors in series with each other, an effect of averaging can be obtained.

Where the two displacement sensors are used for the detection of the load, the detection sensitivity can be doubled by determining the difference between respective outputs of those displacement sensors.

A sensor-incorporated wheel support bearing assembly according to a second aspect of the present invention includes an outer member having an inner peripheral surface formed with a plurality of raceways defined therein, an inner member formed with raceways defined therein that are respectively opposed to the raceways in the outer member and coupled with the wheel, a plurality of rows of rolling elements interposed between the raceways that are opposed to each other, a to-be-detected ring provided on the inner member and having an eccentric or multangular outer diametric shape, and displacement sensors provided on the outer member. Each of the displacement sensors is so arranged to have a facing portion area thereon, which faces to the to-be-detected ring, variable with rotation of the to-be-detected ring, and the displacement sensors are arranged symmetrically on each side of the to-be-detected ring to form a sensor unit. The one or a plurality of the sensor units are arranged in a circumferential direction.

According to this construction, both of the rotation angle of the inner member and the load acting thereon can be detected only from the output of the displacement sensor having the varying facing portion area, and such an advantage can be appreciated that a multi-sensing function can be performed at the same site with a simplified construction despite that the number of component parts used can be reduced and the structure can be simplified. Accordingly, not only can the load sensor and the rotational angle sensor be installed compactly on the automotive vehicle, but the load acting on the wheel and the rotational speed thereof can be detected stably.

In the present invention, the displacement sensor may be comprised of a magnetic sensor of a winding type. The use of the magnetic sensor of the winding type is advantageous in that the detection of a displacement with the displacement sensor can be achieved stably and with high sensitivity.

In the present invention, the displacement sensor may be comprised of a combination of a magnet and a magnetic detecting element capable of providing an analog output. In the case of this structure, the structure of the displacement sensor can be simplified.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
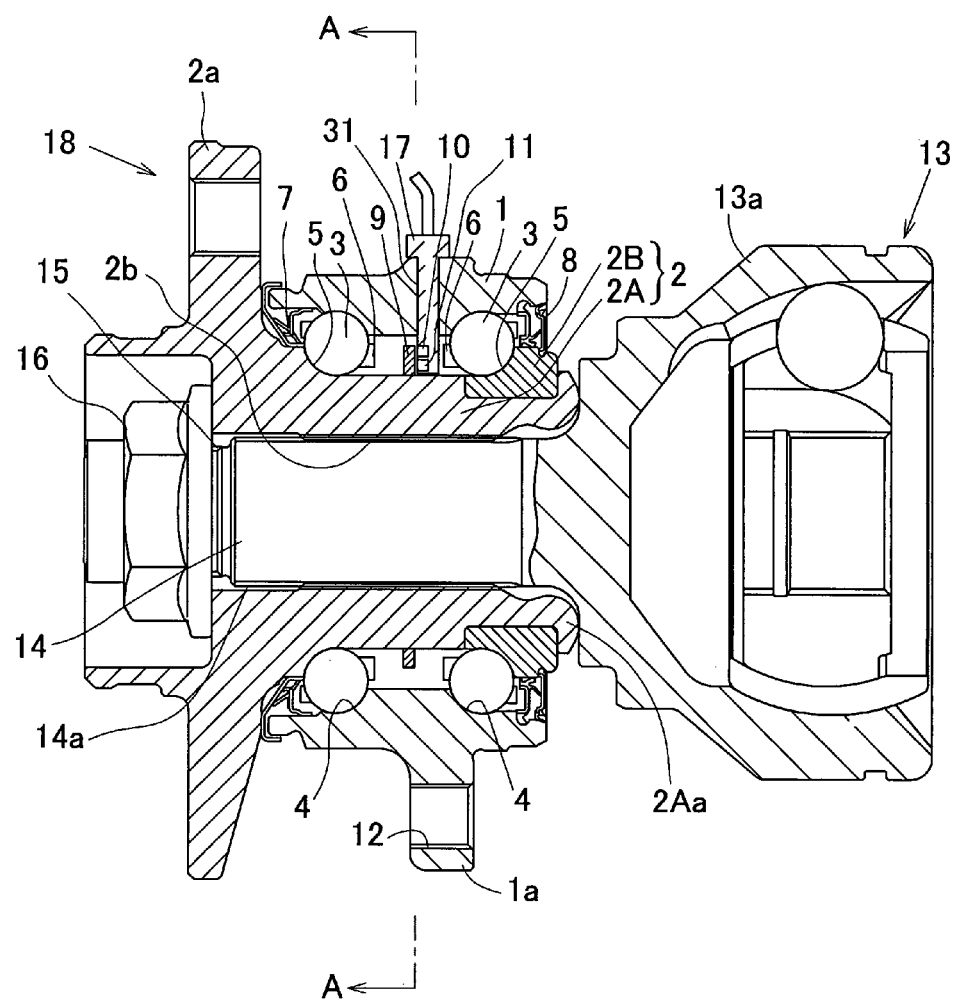
FIG. 1 is a sectional view of a sensor-incorporated wheel support bearing assembly according to a first preferred embodiment of the present invention.

The first preferred embodiment of the present invention will be described in detail with particular reference to FIGS. 1 to 7. A sensor-incorporated wheel support bearing assembly according to this embodiment is an inner race rotating type of a third generation model, and is of a type used for the support of a drive wheel. It is to be noted that the position of the bearing assembly relative to a vehicle body structure that lies on one side of the vehicle body structure remote from the longitudinal center of the vehicle body structure is referred to as an outboard side and the position of the bearing assembly relative to the vehicle body structure that lies on the opposite side of the vehicle body structure close towards the longitudinal center of the vehicle body is referred to as an inboard side. For example, a left side portion of the drawing of FIG. 1 is represented by the outboard side whereas a right side portion thereof is represented by the inboard side.

Referring particularly to FIG. 1, the wheel support bearing assembly 18 includes an outer member 1 having an inner periphery formed with inboard and outboard raceways 4 defined therein, an inner member having an outer periphery formed with inboard and outboard raceways 5 opposed to the inboard and outboard raceways 4, respectively, and double rows of rolling elements 3 interposed between the inboard raceways 4 and 5 and between the outboard raceways 4 and 5. This illustrated wheel support bearing assembly 18 is in the form of a double row angular contact ball bearing, in which each of the raceways 4 and 5 is of an arcuate shape in section and the raceways 4 and 5 are so formed as to have respective contact angles of the inboard side and the outboard side held in back-to-back relation with each other. The rolling elements 3 are in the form of balls and are retained by a retainer 6 employed for each row of those rolling elements 3.

The outer member 1 forms a stationary member and is in the form of a unitary member having an outer periphery formed with vehicle body fitting flanges 1a that are to be secured to a knuckle (not shown). The vehicle body fitting flanges 1a are firmly fastened to the knuckle, installed on a suspension system (not shown) of a vehicle body, by means of bolts (not shown) at a plurality of circumferential locations. The vehicle body fitting flanges 1a are formed with respective mounting holes 12 internally threaded and the bolts referred to above extend through respective throughholes defined in the knuckle with male thread portions at free ends thereof threadingly engaged in the associated mounting holes 12. It is to be noted that instead of forming the mounting holes 12 as internally threaded holes, they may be a hole through which the respective bolts are merely inserted so that such bolt can be fastened with a nut.

The inner member 2 is a rotating member and is made up of a hub axle 2A having an outer periphery formed with a wheel mounting flange 2a, and an inner race 2B that is a separate member mounted on an outer diametric surface of an inboard end of the hub axle 2A, while the hub axle 2A is drivingly coupled with an outer ring 13a of a constant velocity universal joint 13. The outboard and inboard raceways 5 referred to above are formed on the hub axle 2A and the inner race 2B, respectively. Within the hub axle 2A, a stem portion 14, that is formed integrally with the outer ring 13a of the constant velocity universal joint 13, is inserted and by fastening a nut 16 onto a male thread portion 15a provided at a free end of the stem portion 14, the constant velocity universal joint outer ring 13a is drivingly coupled to the hub axle 2A.

The hub axle 2A has an inner diametric surface formed with splined grooves 2b, in which keys 14a formed on the stem portion 14 are engaged. The inner race 2B is mounted on an inboard end portion of the hub axle 2A and fixed in position by means of a crimped portion 2Aa formed at the inboard end of the hub axle 2A so as to urge the inner race 2B axially thereof. An annular space delimited between the outer and inner members 1 and 2 has opposite outboard and inboard open ends which are sealed off by respective sealing members 7 and 8.

Figure 3:
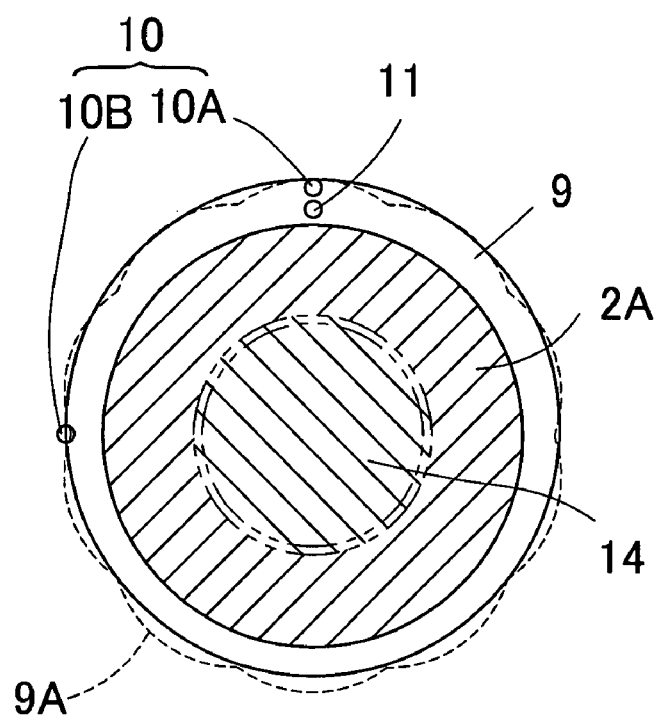
FIG. 3 is a cross-sectional view taken along the line A-A in FIG. 1.
Figure 4:
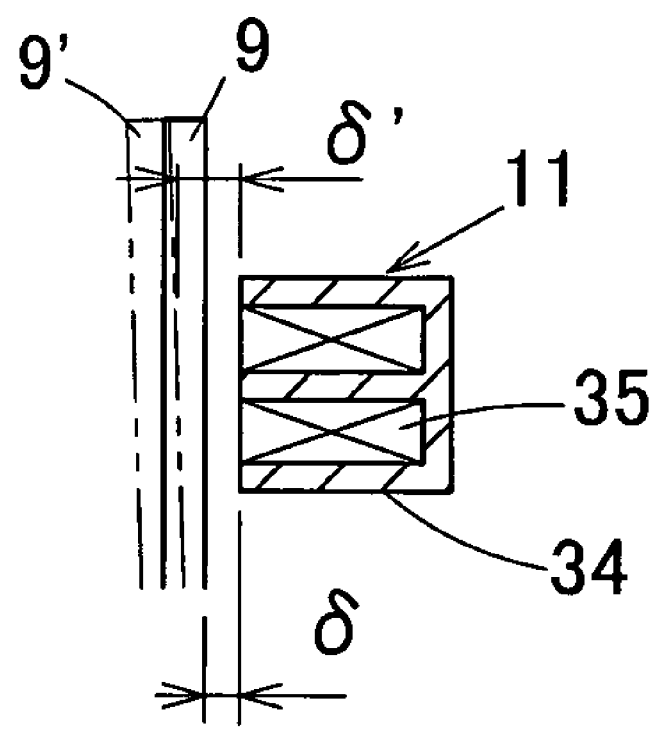
FIG. 4 is an explanatory diagram showing the relation between the to-be-detected ring and the displacement sensor for the detection of the angle, both employed in the wheel support bearing shown in FIG. 1.

The double rows of the raceways 4 and 5 in the wheel support bearing assembly 18 delimit between thereof a space, within which a to-be-detected ring 9 and two displacement sensors 10 and 11 are disposed. FIG. 3 shows a cross-sectional view taken along the line A-A in FIG. 1. As shown therein, the to-be-detected ring 9 is in the form of an annular body having an annular shape offset relative to the axis of rotation, and is firmly press-fitted into an outer diametric surface of the hub axle 2. It is, however, to be noted that in place of the to-be-detected ring of the annular configuration offset relative to the axis of rotation, a to-be-detected ring 9A in the form of an annular body having a multangular outer diametric shape such as shown by the broken line in FIG. 3 may be firmly press-fitted into the outer diametric surface of the hub axle 2A.

The displacement sensors 10 and 11 referred to above are provided in the outer member 1 through a sensor housing 17 shown in FIG. 1. More specifically, the displacement sensors 10 and 11 are accommodated within the sensor housing 17, which is in turn inserted into a mounting hole 31 defined in the outer member 1 so as to extend in a direction radially of the latter and is fixed in position inside the outer member 1 by means of, for example, one or more screws. In such case, the displacement sensors 10 and 11 are so arranged as to confront axially with the to-be-detected ring 9.

Of the displacement sensors 10 and 11, the first displacement sensor 10 is so arranged relative to the to-be-detected ring 9 as to have a facing portion area, facing the to-be-detected ring 9, which area varies with rotation of the to-be-detected ring 9. The other, i.e., second, displacement sensor 11 is so arranged relative to the to-be-detected ring 9 as to have a facing portion area, facing the to-be-detected ring 9, which area does not vary with rotation of the to-be-detected ring 9. By way of example, the second displacement sensor 11 in its entirety is so arranged as to face the to-be-detected ring 9.

Figure 2A:
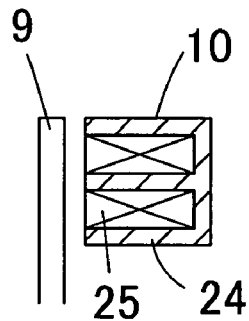
FIG. 2A is an explanatory diagram showing cooperatively with FIG. 2B the relation between a to-be-detected ring and a displacement sensor for the detection of an angle, both employed in the wheel support bearing shown in FIG. 1.
Figure 2B:
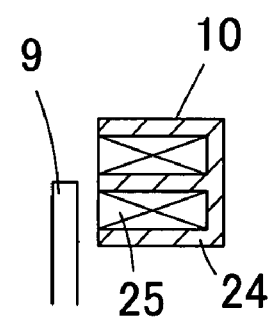
FIG. 2B is an explanatory diagram showing cooperatively with FIG. 2A the relation between a to-be-detected ring and a displacement sensor for the detection of an angle, both employed in the wheel support bearing shown in FIG. 1.

The facing portion area on the first displacement sensor 10 referred to above facing the to-be-detected ring 9 varies in a manner as shown in FIGS. 2A and 2B with rotation of the to-be-detected ring 9 accompanied by rotation of the hub axle 2A. More specifically, FIG. 2A illustrates the position of the to-be-detected ring 9, at which the facing portion area on the displacement sensor 10 facing the to-be-detected ring 9 is at maximum. On the other hand, FIG. 2B illustrates the position of the to-be-detected ring 9, at which the facing portion area on the displacement sensor 10 facing the to-be-detected ring 9 is at minimum. With the first displacement sensor 10 so arranged as described above, since an output from the displacement sensor 10 continuously changes with rotation of the to-be-detected ring 9, the rotational position of the wheel support bearing assembly 18 and the rotational speed thereof can be detected by implementing a segmented processing of an outputted signal from the displacement sensor 10. Processing of the output from the displacement sensor 10 is carried out by a rotational angle detecting circuit 32 as will be described later.

For each of the displacement sensors 10 and 11, any types of sensor can be employed, while the illustrated embodiment makes use of a winding magnetic sensor or a winding reluctance type. In other words, the first displacement sensor 10 includes, as best shown in FIGS. 2A and 2B, a yoke 24 of a generally E-sectioned configuration having a coiled winding 25 embedded therein and is so designed as to detect a displacement in terms of a change in inductance of the coiled winding 25 that is brought about by change in surface area thereof facing the to-be-detected ring 9. Similarly, the second displacement sensor 11 includes a yoke 34 of a generally E-sectioned configuration having a coiled winding 35 embedded therein and is so designed as to detect a displacement in terms of a change in inductance of the coiled winding 25 that is brought about by change of an air gap between it and the to-be-detected ring 9. Thus, displacement detection with those displacement sensors 10 and 11 can be accomplished stably and with high sensitivity.

In the illustrated embodiment, two of the first displacement sensors 10 are employed (as indicated by sensors 10A and 10B) as shown in FIG. 3 and those two sensors 10A and 10B are so arranged as to be spaced such a distance from each other in a direction circumferential of the bearing assembly that respective output signals from those first displacement sensors 10A and 10B can have corresponding electrical phases displaced 90° from each other. More specifically, since in this illustrated embodiment, the to-be-detected ring 9 is in the form of an eccentric ring and each of the outputs from the displacement sensors 10A and 10B represents one cycle of sine wave for each complete rotation of the to-be-detected ring 9, the two first displacement sensors 10A and 10B are so arranged as to be spaced a mechanical angle of 90° from each other. In such case, of those two first displacement sensors 10A and 10B, one provides an output signal of a sine wave whereas the other provides an output signal of a cosine wave. Accordingly, by determining a tangent from those output signals, the rotational angle of the inner member 2 can be detected.

Where as shown by the broken line in FIG. 3, the to-be-detected ring 9A having the multangular outer diametric shape is employed, a mutiple-cycle signal can be obtained for each complete rotation of the to-be-detected ring 9A and, accordingly, the resolution of the detected angle can increase. In such case, it is necessary to alter the position of the displacement sensor 10B relative to the displacement sensor 10A in a circumferential direction so that the sine wave and the cosine wave can be obtained from those two displacement sensors 10A and 10B, respectively, in accordance with the number of poles (the number of wave peaks) of the multangular shape.

The displacement sensors 11 is used to detect an axle load acting on the wheel support bearing assembly 18 and, more specifically, the bending moment load (axial load) occurring during cornering of the automotive vehicle. Since when a cornering force acts on the hub axle 2A, the hub axle 2A tilts, the to-be-detected ring 9 secured to the hub axle 2A tilts to a position 9' shown by the double-dotted lines in FIG. 4 with the air gap δ between it and the displacement sensor 11 correspondingly changing to δ'. By detecting such a change in air gap in terms of a change in inductance of the coiled winding 35, the load can be detected.

Figures 5A, 5B:
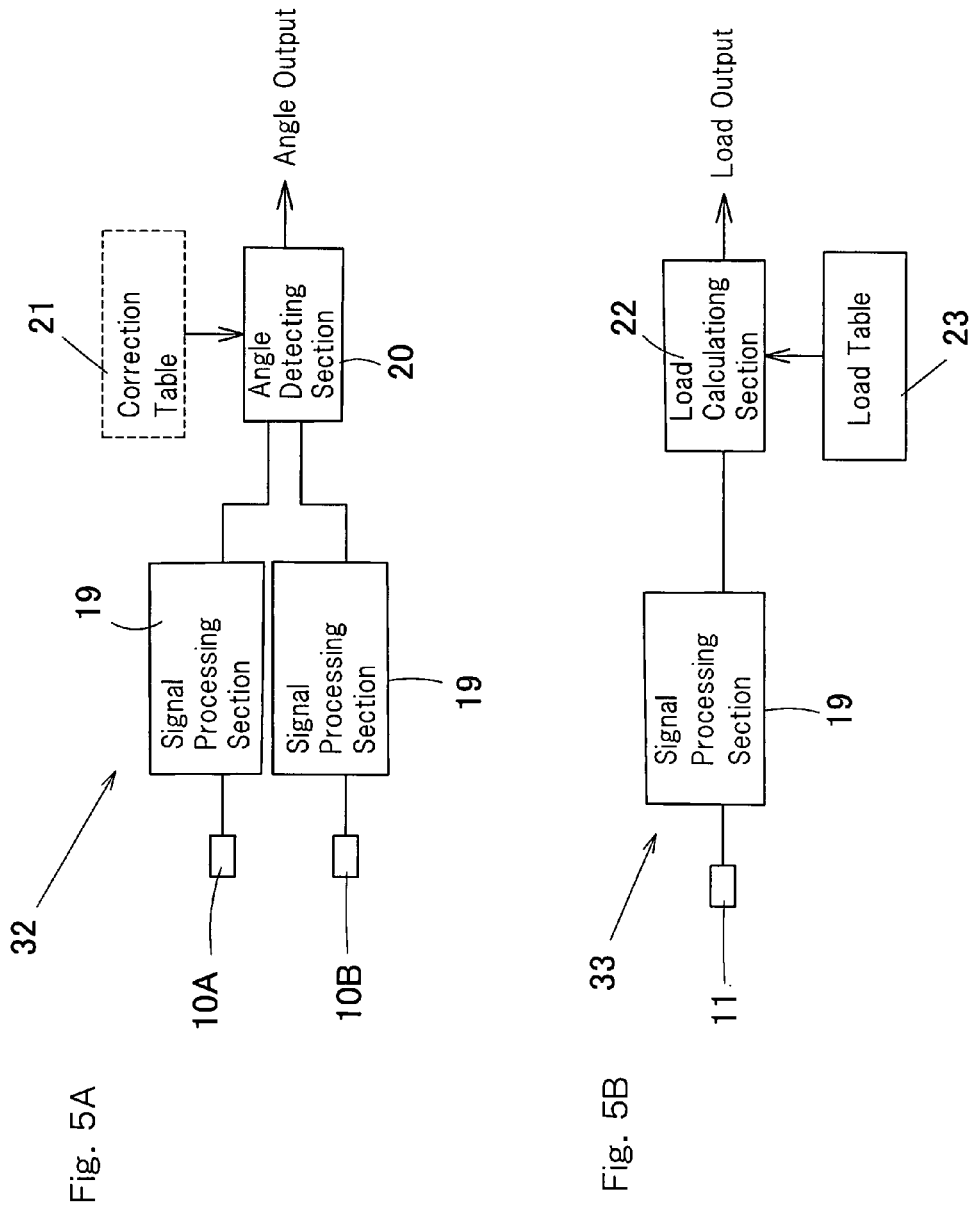
FIG. 5A is a block diagram showing an example of an electric circuit of a rotational angle detecting circuit employed in the wheel support bearing assembly.
FIG. 5B is a block diagram showing an example of an electric circuit of a load detecting circuit.

FIGS. 5A and 5B illustrate in circuit block diagrams, signal processing circuits forming the detecting circuits 32 and 33 for detecting the rotational angle and the load, respectively, as discussed above. Specifically, in the rotational angle detecting circuit 32 shown in FIG. 5A, the respective output signals from the displacement sensor 10 (10A and 10B) are converted into analog signals with associated signal processing sections 19 to provide the sine wave and the cosine wave. From respective values of those waveform signals, an angle detecting section 20 performs a division to determine the tangent and, by comparing the result of such division with data in a correction table 21, the rotation angle of the inner member 2 can be derived. Thus, by obtaining the rotation angle is obtained in this way, not only the rotation angle of the inner member 2, but also the direction of rotation thereof can be detected.

In the load detecting circuit 33 shown in FIG. 5B, the output signal from the displacement sensor 11 is converted into an analog signal with the signal processing section 19 and, by comparing such signal in a load calculating section 22 with data in a load table 23, the axial load acting on the wheel support bearing 18 can be obtained.

Figure 6:
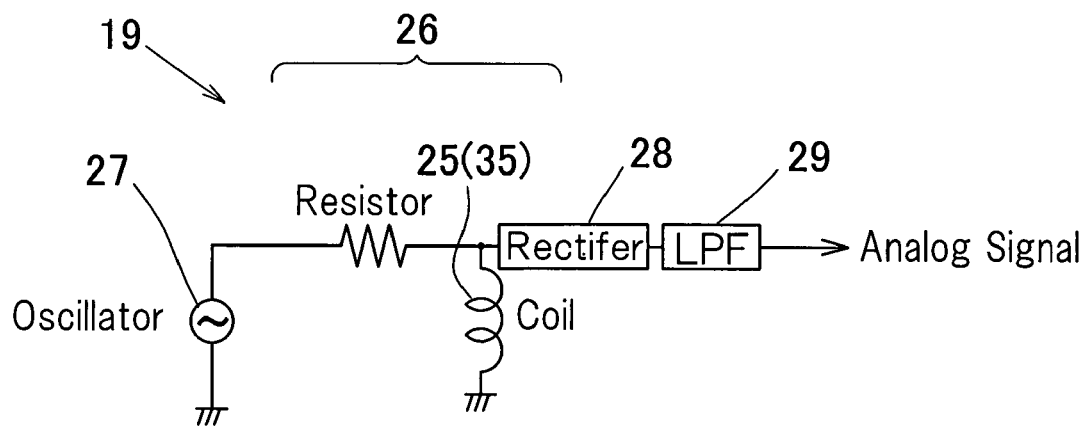
FIG. 6 is an electric circuit diagram showing an example of an electric circuit of a signal processing section used in the rotational angle detecting circuit or the load detecting circuit.

FIG. 6 illustrates one example of a specific electric circuit of the signal processing section 19 employed in any one of the rotational angle detecting circuit 32 and the load detecting circuit 33. In this example, an alternating current voltage of a few tens kHz is applied from an oscillator 27 to a series circuit portion 26 including the coiled winding 25 (35) of the displacement sensor 10 and a resistor, and a divided voltage across the coiled winding 25 (35) is converted by a rectifier 28 and a low pass filter 29 into a direct current voltage and then into an analog signal.

Figure 7:
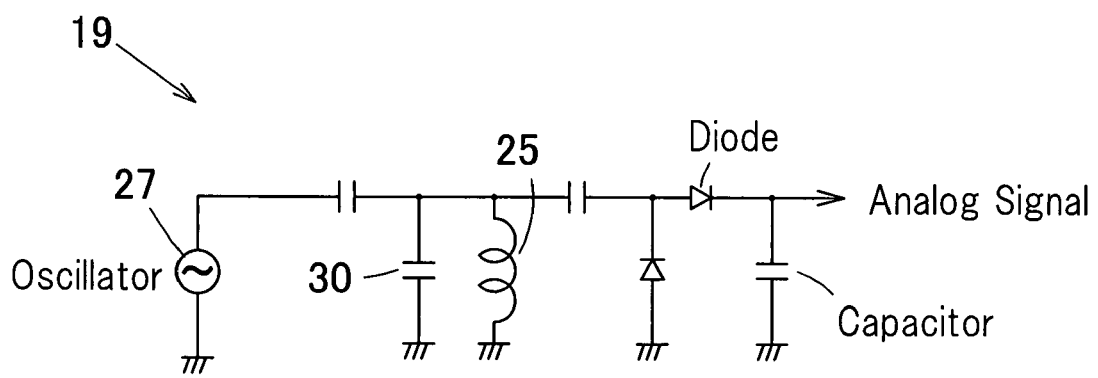
FIG. 7 is an electric circuit diagram showing another example of the electric circuit of the signal processing section used in the rotational angle detecting circuit or the load detecting circuit.

FIG. 7 illustrates a different example of the specific electric circuit of the signal processing section 19 employed in any one of the rotational angle detecting circuit 32 and the load detecting circuit 33. In this example, in place of the series circuit portion 26, a resonance circuit including a capacitor 30 and the coiled winding 25 (35) is employed, and the rectifier 28 and the low pass filter 29 are replaced with a diode and a smoothing capacitor, respectively.

According to the sensor-incorporated wheel support bearing assembly 18 of the construction described above, as hereinabove described, the to-be-detected ring 9 (9A) of the eccentric outer diametric shape or the multangular outer diametric shape is provided in the inner member 2, and the displacement sensor 10 (10A and 10B) and 11 are provided in the outer member 1 in face-to-face relation with the to-be-detected ring 9 (9A). Of those displacement sensors, the displacement sensor 11 is so arranged that the facing portion area thereon will not change as the to-be-detected ring 9 (9A) rotates while the displacement sensor 10 is so arranged that the facing portion area thereon will change with rotation of the to-be-detected ring 9 (9A). Also, the use is made of the rotational angle detecting circuit 32 for detecting the rotation angle of the inner member 2 in reference to the output from the displacement sensor 10, and of the load detecting circuit 33 for detecting the load, acting on the inner member 2, in reference to the output from the displacement sensor 10. For this reason, the displacement sensor 11 can detect a change of the air gap between the to-be-detected ring 9 (9A) and the displacement sensor 11, which has resulted from tilting of the inner member 2, and the moment load (the axial load) can be detected from the output of the displacement sensor 11. Also, from the output of the displacement sensor 10 (10A and 10B), the rotation angle of the wheel can be detected. Since the to-be-detected ring 9 (9A) is concurrently used for both of the load detection and the rotational angle detection as hereinbefore described, a device comprised of the load sensor and the rotational angle sensor can be installed compactly in the automotive vehicle and both of the load acting on the vehicle wheel and the rotational speed of the vehicle wheel can be detected stably.

Also, since in this embodiment, the two first displacement sensors 10 (10A and 10B) having their facing portion areas variable with rotation of the to-be-detected ring 9 (9A) are employed and those displacement sensors are so provided on the circumference that they may have respective output electric angles offset 90° in phase relative to each other, and the rotation angle of the inner member 2 can be detected from a signal outputted therefrom, not only the rotation angle of the inner member 2, but also the direction of rotation of the inner member 2 can be detected.

Since each of the displacement sensors 10 and 11 is comprised of a magnetic sensor of a winding type, displacement detection with those displacement sensors 10 and 11 can be achieved stably and with high sensitivity.

Figure 8:
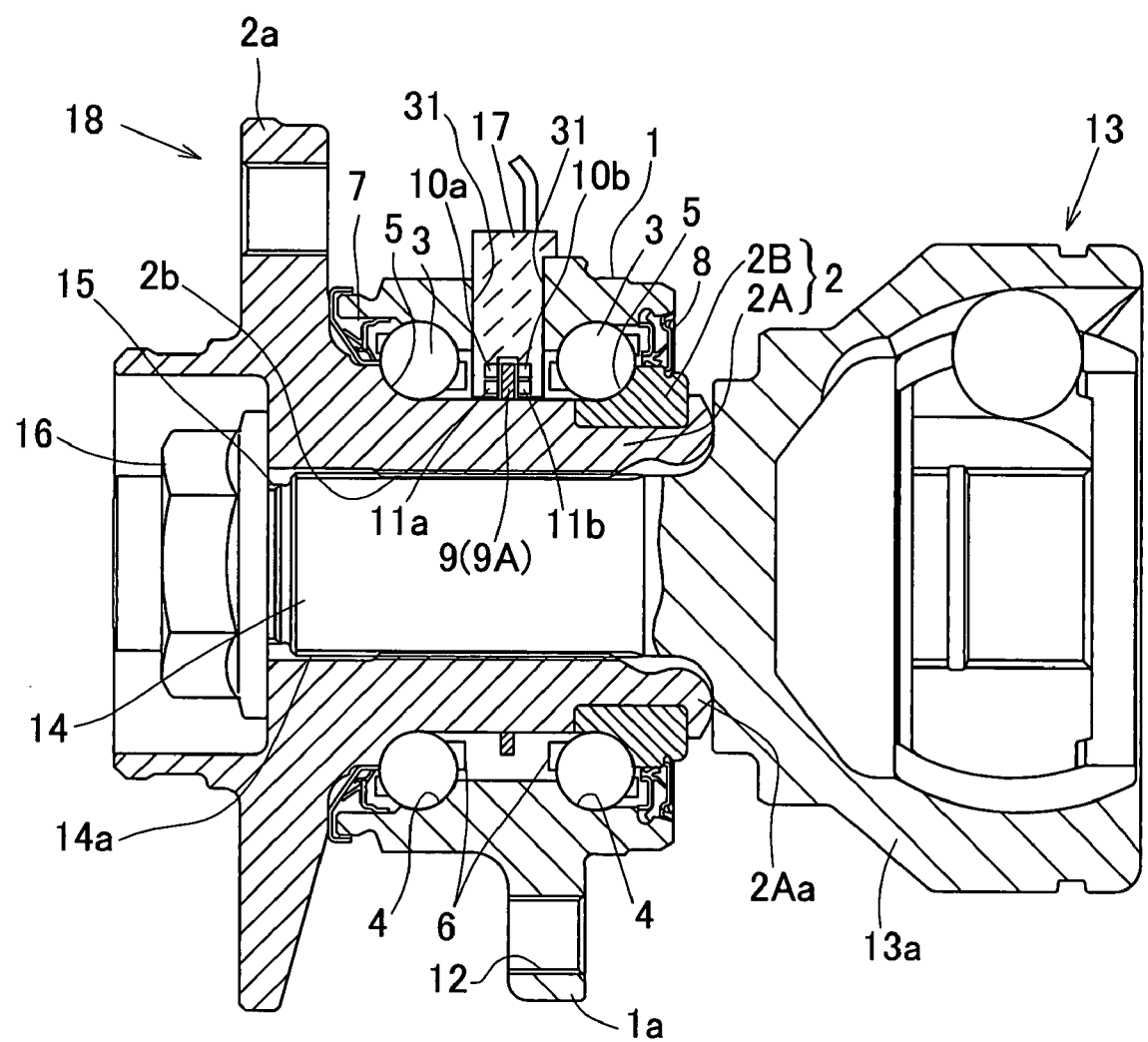
FIG. 8 is a sectional view of the sensor-incorporated wheel support bearing assembly according to a second preferred embodiment of the present invention.

FIG. 8 illustrates a second preferred embodiment. The sensor-incorporated wheel support bearing assembly according to this embodiment is similar to that according to the foregoing first embodiment shown in and described with reference to FIGS. 1 to 7, but differs therefrom in that in this embodiment, two sensors are employed for each of the first and second displacement sensors 10 and 11, and the two displacement sensors 10 (10a and 10b) or 11 (11a and 11b) are arranged in an axial direction symmetrically on respective sides of the to-be-detected ring 9 (9A). Other structural features than those described above are similar to those of the first embodiment.

Where such a construction as described above is employed, a wobbling motion of the to-be-detected ring 9 (9A) during rotation thereof and/or a load component occurring when the load acts can be counterbalanced. For example, while the first displacement sensor 10 for the detection of the rotational angle can be accompanied by an offset of the signal depending on the magnitude of the bending moment when the latter acts on the hub axle 2A, resulting in an adverse influence on the angle detection, positioning of the two displacement sensors 10a and 10b on respective sides of the to-be-detected ring 9 (A) in opposition thereto and taking an average of respective outputs of the two displacement sensors 10a and 10b can eliminate the adverse influence which may be brought about by the load. It is to be noted that in this case, even though the respective coiled windings of those two displacement sensors 10a and 10b are connected in series with each other, an effect of averaging can be obtained.

Where the two displacement sensors 11a and 11b for the detection of the load are arranged in the axial direction symmetrically on respective sides of the to-be-detected ring 9 (9A) in opposition thereto as referred to this embodiment, the detection sensitivity can be doubled by calculating the difference between the respective outputs of the displacement sensors 11a and 11b.

Figure 9:
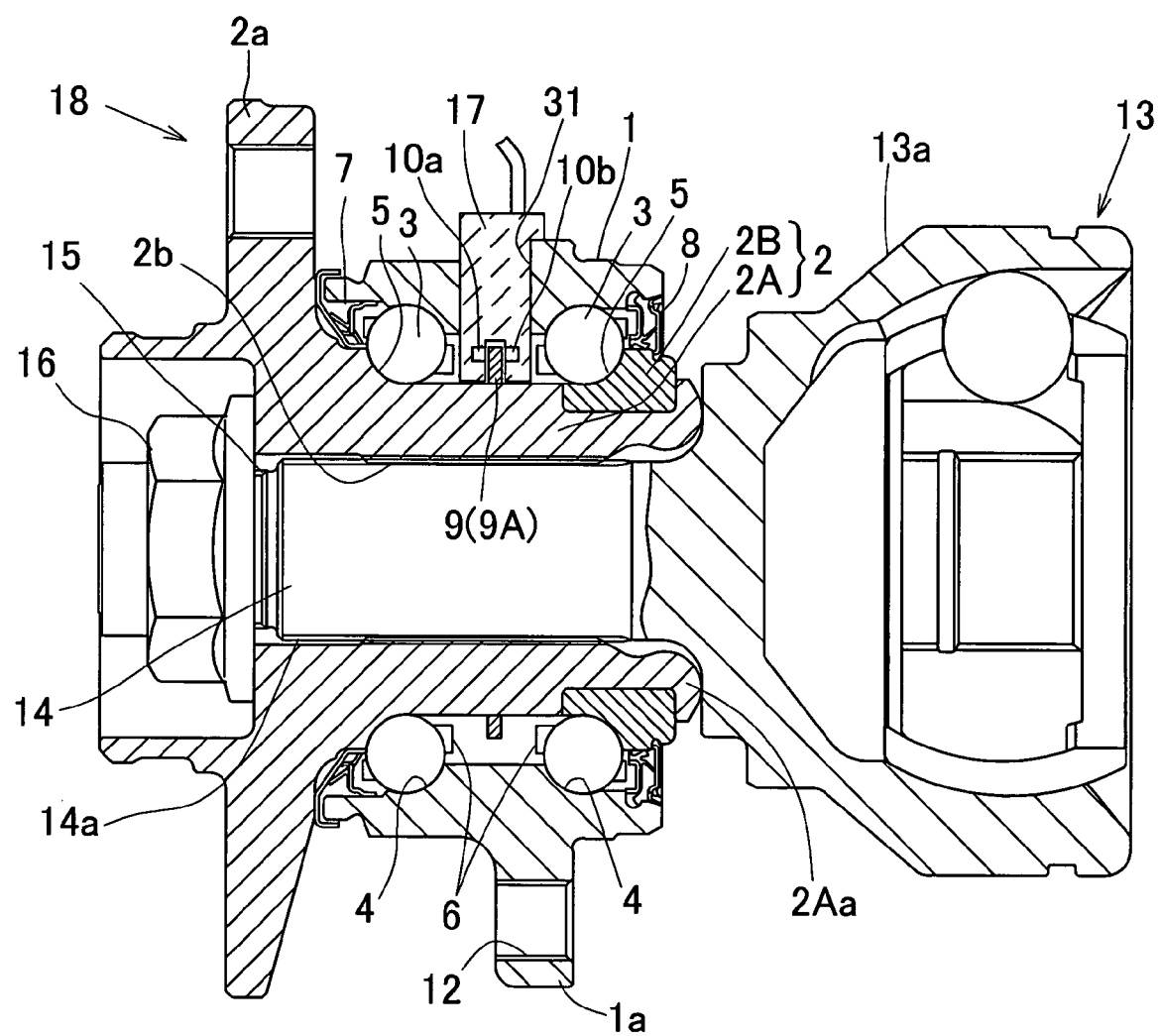
FIG. 9 is a sectional view of the sensor-incorporated wheel support bearing assembly according to a third preferred embodiment of the present invention.

FIG. 9 illustrates a third preferred embodiment of the present invention. The sensor-incorporated wheel support bearing assembly according to this embodiment is similar to that according to the first embodiment shown in and described with reference to FIGS. 1 to 7, but differs therefrom in that in this embodiment, only two displacement sensors 10a and 10b each having a facing portion area variable with rotation of the to-be-detected ring 9 (9A) are employed for the displacement sensor and are arranged in the axial direction symmetrically on respective sides of the to-be-detected ring 9 (9A) to form a sensor unit. In this case, a signal representative of an average of the respective outputs of the two displacement sensors 10a and 10b that are symmetrically arranged is used for the detection of the rotational angle, and a signal representative of an difference of the respective outputs of the two displacement sensors 10a and 10b is used for the detection of the load. Other structural features than those described above are similar to those of the first embodiment.

Figure 10:
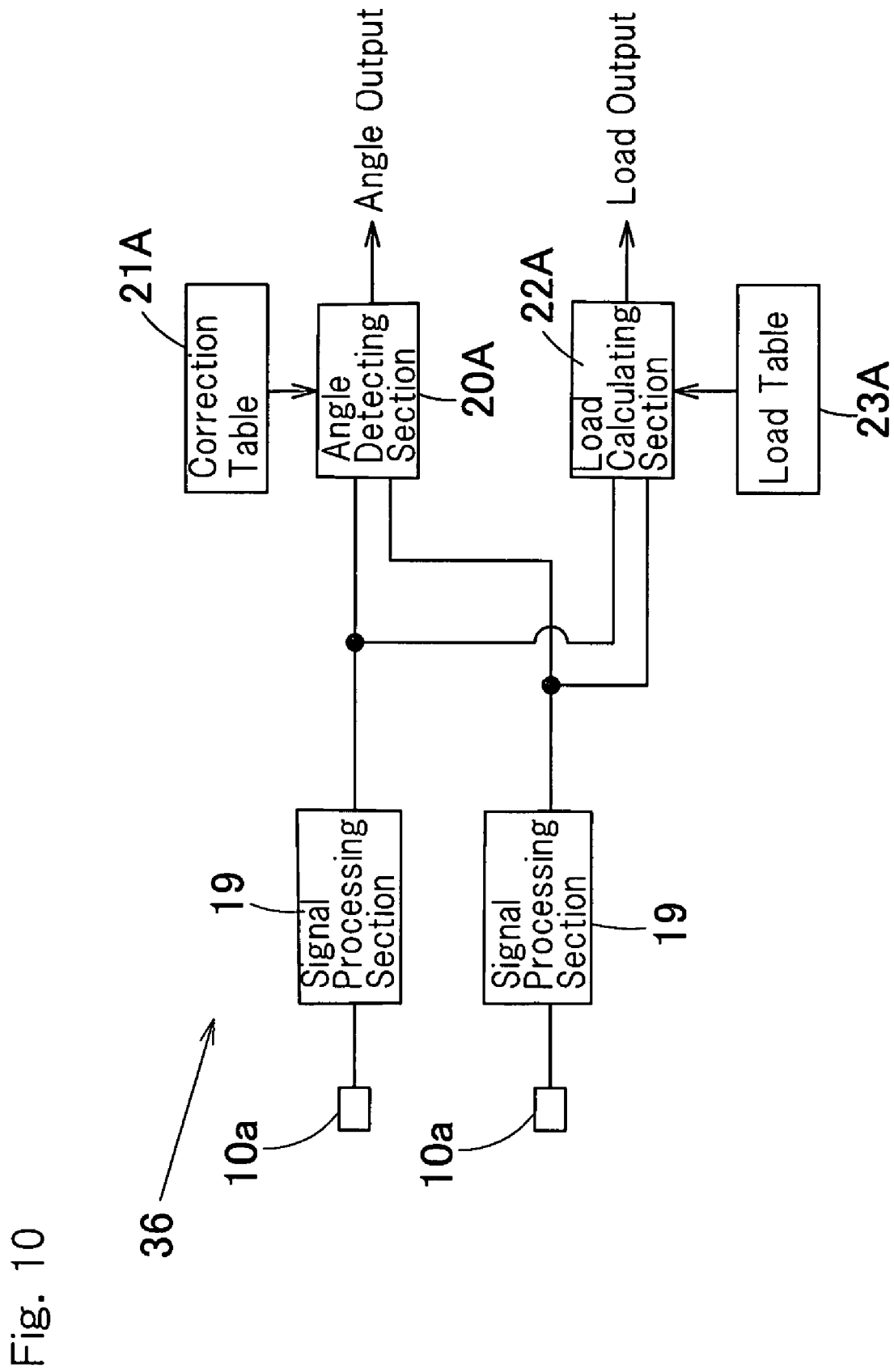
FIG. 10 is a block diagram showing an example of an electric circuit of a detecting circuit employed in the wheel support bearing assembly shown in FIG. 9.

FIG. 10 illustrates in circuit block diagrams, one example of the signal processing circuits forming the detecting circuit 36 for detecting the rotational angle and the load, respectively, based on the respective outputs of the two displacement sensors 10a and 10b according to the third embodiment. In this detecting circuit 36, the output signals from the two displacement sensors 10a and 10b are converted by separate signal processing sections 19 into analog signals, respectively; an average value of those two signals is determined with an angle detecting section 20A; and a result thereof is compared with data in the correction table 21A to provide the rotational angle. Independently thereof, the difference between the two signals that have been converted in the signal processing sections 19 into the associated analog signals is calculated by a load calculating section 22A, and a result of such calculation is then compared with data in the load table 23A to thereby provide the axial load acting on the wheel support bearing assembly 18.

It is to be noted where in this embodiment the value detected of the load as the to-be-detected ring 9 (9A) fluctuates sinusoidally, a true load can be calculated by performing the calculating process using information on the detection of the rotational angle. Also, although in FIG. 9, only one sensor unit comprised of the sensor housing 17 accommodating therein the two displacement sensors 10a and 10b is shown, such an arrangement may be made that two sensor units are arranged at two circumferential locations at which outputs of 90° in electric angle can be obtained, so that the calculation process can be performed using the respective outputs of the displacement sensors 10a and 10b within the sensor housing 17.

In such constructions referred to above, by changing the respective positions of the displacement sensors 10a and 10b opposed to the eccentric or multangular to-be-detected ring 9 (9A), both of the rotation angle of the inner member 2 and the load acting on the inner member 2 can be measured and, therefore, such an advantage can be appreciated that a multisensing function can be performed at the same site with a simplified construction. Although the to-be-detected ring 9 of the eccentric outer diametric shape shown in FIG. 1 may have a generally L-shaped section and the speed can be detected with one side face of an upright piece thereof used as a magnetic encoder, this particular embodiment is particularly advantageous in that since both of the load and the rotational angle are detected with the use of the same sensor, the number of component parts used can be reduced and circuit components can be commonly shared.

It is to be noted that although in describing each of the foregoing embodiments, reference has been made to the to-be-detected ring 9 (9A) fixed in position between the double rows of the raceways 5 and 5 defined in the inner member 2, the position at which the to-be-detected ring 9 (9A) is fixed is not always limited to such position.

Figure 11:
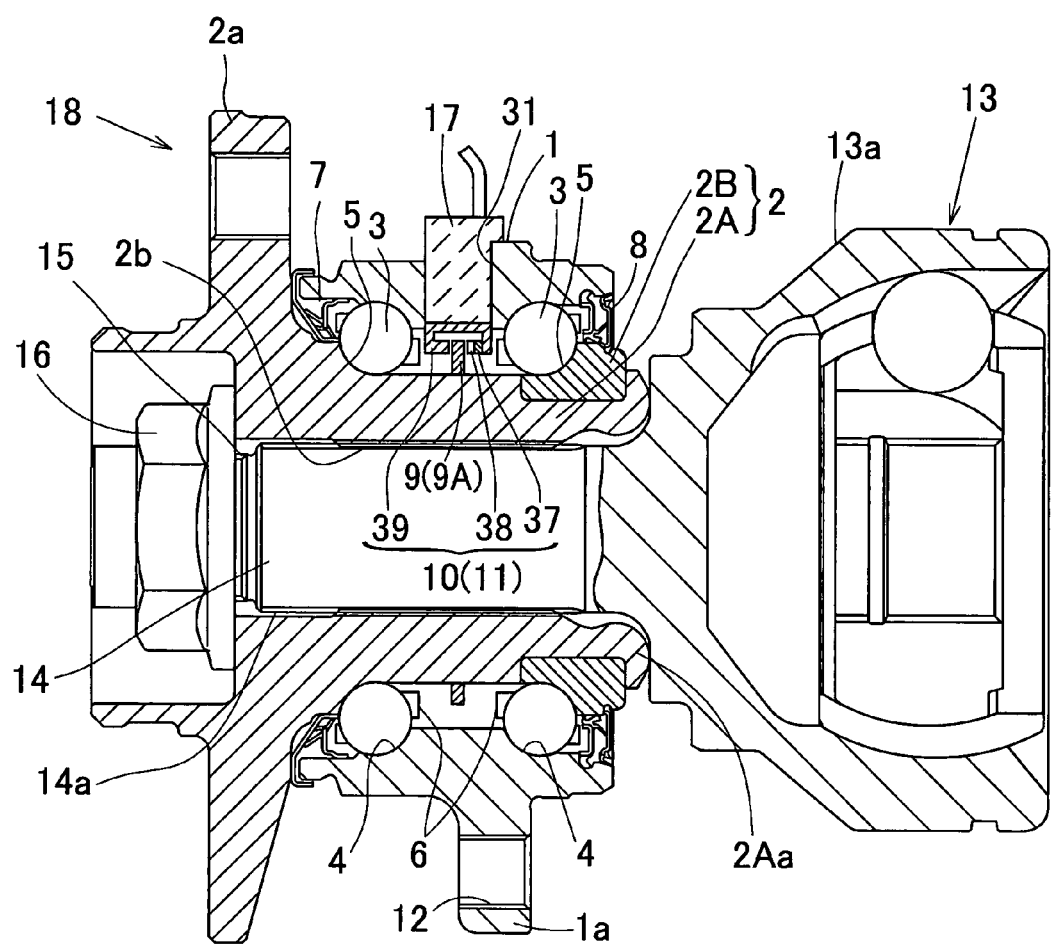
FIG. 11 is a sectional view of the sensor-incorporated wheel support bearing assembly according to a fourth preferred embodiment of the present invention.

Also, although in describing each of the foregoing embodiment reference has been made to the use of the magnetic sensor of winding type for each of the displacement sensors 10 and 11, a sensor system, in which a magnetic loop is formed with a magnet 37, a magnetic detecting element 38 such as, for example, a Hall integrated circuit capable of providing an analog output, and a yoke 39 made of a magnetic material, may be employed such as a fourth preferred embodiment shown in FIG. 11, for each of the displacement sensors 10 and 11 used in the practice of, for example, the first embodiment. It is also to be noted that in FIG. 11, the two displacement sensors 10 and 11 are displaced relative to each other in the circumferential direction.

The value detected of the angle and the value detected of the load in each of the foregoing embodiments described hereinbefore are incorporated in an ECU (Electric Control Unit) of an automobile and are utilized for the control of the travel stability of the automotive vehicle and are available as the road information for the steer-by-wire system.

What is claimed is:

1. A sensor-incorporated wheel support bearing assembly for rotatably supporting a wheel relative to a vehicle body structure, the assembly comprising:
    an outer member having an inner peripheral surface formed with a plurality of raceways defined therein;
    an inner member formed with raceways defined therein that are respectively opposed to the raceways in the outer member and coupled with the wheel;
    a plurality of rows of rolling elements interposed between the raceways that are opposed to each other;
    a to-be-detected ring provided on the inner member and having an eccentric or multangular outer diametric shape; and
    first and second displacement sensors provided on the outer member,
    wherein the first displacement sensor is arranged to have a facing portion area thereon, which faces the to-be-detected ring, variable with rotation of the to-be-detected ring, and the second displacement sensor is arranged to have a facing potion area thereon, which faces to the to-be-detected ring, invariable with rotation of the to-be-detected ring.

2. The sensor-incorporated wheel support bearing assembly according to claim 1 further comprising:
    a circuit to detect a rotation angle of the inner member from an output of the first displacement sensors having the facing portion area variable with rotation of the to-be-detected ring; and
    a circuit to detect load acting on the inner member from an output of the second displacement sensor having the facing portion area invariable with rotation of the to-be-detected ring.

3. The sensor-incorporated wheel support bearing assembly according to claim 1, further comprising:
    two first displacement sensors having the facing portion areas variable with rotation of the to-be-detected ring arranged on a circumference so that respective electric angles of outputs thereof are offset 90° in phase from each other; and
    a circuit to detect the rotation angle of the inner member from the output signals.

4. The sensor-incorporated wheel support bearing assembly according to claim 1, wherein the first and second displacement sensors having the respective facing portion areas variable and invariable with rotation of the to-be-detected ring are provided in the form of one or more sensor units arranged in a circumferential direction, each of the sensor units including the displacement sensors arranged symmetrically on respective sides of the to-be-detected ring.

5. The sensor-incorporated wheel support bearing assembly according to claim 1, wherein each of the displacement sensors is comprised of a magnetic sensor of a winding type.

6. The sensor-incorporated wheel support bearing assembly according to claim 1, wherein each of the displacement sensor comprises a combination of a magnet and a magnetic detecting element capable of providing an analog output.

7. A sensor-incorporated wheel support bearing assembly for rotatably supporting a wheel relative to a vehicle body structure, the assembly comprising:
    an outer member having an inner peripheral surface formed with a plurality of raceways defined therein;
    an inner member formed with raceways defined therein that are respectively opposed to the raceways in the outer member and coupled with the wheel;
    a plurality of rows of rolling elements interposed between the raceways that are opposed to each other;
    a to-be-detected ring provided on the inner member and having an eccentric or multangular outer diametric shape; and
    displacement sensors provided on the outer member,
    wherein each of the displacement sensors is arranged to have a facing portion area thereon, which faces the to-be-detected ring, variable with rotation of the to-be-detected ring, and the displacement sensors are arranged symmetrically on each side of the to-be-detected ring to form a sensor unit, and
    wherein the one or a plurality of the sensor units are arranged in a circumferential direction of the to-be-detected ring.

8. The sensor-incorporated wheel support bearing assembly according to claim 7, further comprising a circuit to detect both of an angle and a load by calculating respective outputs from the displacement sensors arranged symmetrically on the respective sides of the to-be-detected ring.

9. The sensor-incorporated wheel support bearing assembly according to claim 7, wherein the displacement sensor comprises a magnetic sensor of a winding type.

10. The sensor-incorporated wheel support bearing assembly according to claim 7, wherein the displacement sensor comprises a combination of a magnet and a magnetic detecting element capable of providing an analog output.

* * * * *